(12) United States Patent
Chen et al.

(10) Patent No.: US 9,753,605 B2
(45) Date of Patent: Sep. 5, 2017

(54) ACTION TOOL BAR FOR MOBILE APPLICATIONS

(75) Inventors: Chun-Yi Chen, Belmont, CA (US); Brent-Kaan William White, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 762 days.

(21) Appl. No.: 12/788,544

(22) Filed: May 27, 2010

(65) Prior Publication Data

US 2011/0296346 A1    Dec. 1, 2011

(51) Int. Cl.
  *G06F 3/0481*    (2013.01)
  *H04M 1/725*    (2006.01)

(52) U.S. Cl.
  CPC ..... *G06F 3/04817* (2013.01); *H04M 1/72583* (2013.01)

(58) Field of Classification Search
  CPC .................. G06F 3/0482; H04M 1/72583
  USPC .................................. 715/811, 825
  See application file for complete search history.

(56) References Cited

U.S. PATENT DOCUMENTS

| | | | | |
|---|---|---|---|---|
| 5,748,927 A * | 5/1998 | Stein | ........... | G06F 3/04895 715/711 |
| 5,963,659 A * | 10/1999 | Cahill et al. | ........... | 382/139 |
| 6,278,450 B1 * | 8/2001 | Arcuri et al. | ........... | 715/763 |
| 6,883,143 B2 * | 4/2005 | Driskell | ........... | 715/763 |
| 6,989,821 B2 | 1/2006 | Chafer et al. | | |
| 7,827,503 B2 * | 11/2010 | Jang | ........... | 715/769 |
| 8,234,575 B2 * | 7/2012 | Hartin et al. | ........... | 715/744 |
| 8,548,991 B1 * | 10/2013 | Zamir et al. | ........... | 707/723 |
| 2003/0202009 A1 * | 10/2003 | Kasriel | ........... | G06F 17/30905 715/739 |
| 2004/0223004 A1 | 11/2004 | Lincke | | |
| 2006/0090141 A1 * | 4/2006 | Loui | ........... | G06F 17/30064 715/764 |
| 2006/0149734 A1 * | 7/2006 | Egnor | ........... | G06F 17/3087 |
| 2007/0186180 A1 * | 8/2007 | Morgan | ........... | H04N 5/44543 715/779 |
| 2008/0062461 A1 * | 3/2008 | Shiono | ........... | G06F 3/1203 358/1.15 |
| 2008/0104118 A1 | 5/2008 | Pulfer et al. | | |
| 2008/0186285 A1 | 8/2008 | Shimizu | | |

(Continued)

OTHER PUBLICATIONS

"Efficient and flexible notes organizer for Pocket PC: keeping it simple, manageable and easy to find"; pp. 1-3, Jan. 1, 2001; http://www.prlog.org/10073122-efficient-and-flexible-notes-organizer-for-pocket-pc-keeping-it-simple-manageable-and-easy-to-find.html.

(Continued)

*Primary Examiner* — Sara England
(74) *Attorney, Agent, or Firm* — Miles & Stockbridge P.C.

(57) ABSTRACT

According to one embodiment, a computer-implemented method for dynamically providing a tool bar in a user interface is provided. The method includes determining at least one action that is commonly performed based on data displayed on a current page of a graphical user interface of a communications device, creating a tool bar comprising at least one icon representing the at least one action, associating the tool bar with the current page of the graphical user interface, and providing the tool bar to the communications device for display on the current page of the graphical user interface.

15 Claims, 8 Drawing Sheets

(56) References Cited

U.S. PATENT DOCUMENTS

| | | |
|---|---|---|
| 2008/0195954 A1* | 8/2008 | Dharmarajan et al. ....... 715/749 |
| 2008/0215976 A1* | 9/2008 | Bierner ................ G06Q 99/00 |
| | | 715/708 |
| 2008/0300940 A1 | 12/2008 | Aravamudan |
| 2009/0006994 A1 | 1/2009 | Forstall et al. |
| 2009/0113333 A1 | 4/2009 | Dellinger et al. |
| 2009/0199114 A1 | 8/2009 | Lewis et al. |
| 2009/0228820 A1 | 9/2009 | Kim et al. |
| 2010/0331043 A1* | 12/2010 | Chapman et al. ......... 455/556.1 |

OTHER PUBLICATIONS

"Samsung Pixon M8800 Glasgow"; pp. 1-6, Jan. 1, 2001; http://local.techradar.com/Samsung_Pixon_M8800_Glasgow-rl129964-Glasgow_SC.html.

* cited by examiner

ACTION TOOL BAR FOR MOBILE APPLICATIONS

FIELD

Embodiments of the invention generally relate to computer and information systems that provide a user interface for electronic devices, such as mobile communications devices.

BACKGROUND INFORMATION

User interfaces (UIs) provide a mechanism by which users can interact with a machine, device, or system. A user interface includes physical hardware and software components that together provide a means of inputting information to allow a user to manipulate a system, and provide a means of outputting information to allow the system to indicate the effects of the user's manipulation. A graphical user interface (GUI) is a type of user interface that utilize images and graphics, in addition to text, to facilitate interaction between a user and the system. For example, a GUI may offer graphical icons, windows, and/or buttons to represent information and actions available to the user.

Examples of systems that may incorporate a graphical user interface include, but are not limited to, computers or computing systems, communications devices including mobile phones, music and media players, gaming systems, navigation systems, appliances, and many other devices and machines. User interfaces are generally intended to make a user's interaction with these systems easier and more productive.

SUMMARY

According to one embodiment, a computer-implemented method for dynamically providing a tool bar in a user interface is provided. The method includes determining at least one action that is commonly performed based on data displayed on a current page of a graphical user interface of a communications device, creating a tool bar comprising at least one icon representing the at least one action, associating the tool bar with the current page of the graphical user interface, and providing the tool bar to the communications device for display on the current page of the graphical user interface.

BRIEF DESCRIPTION OF THE DRAWINGS

For proper understanding of the invention, reference should be made to the accompanying drawings, wherein.

DETAILED DESCRIPTION

One embodiment of the invention is directed to a system for providing a dynamic tool bar in a user interface (UI). The user interface may be a graphical user interface displayed on a screen of a communications device. In one example, the system is configured to determine actions that are most commonly performed based on what information is displayed on the current screen or page of the user interface. The system may then create a tool bar that includes icons representing those actions that are commonly performed by a user on the current screen. The tool bar is then associated with the current screen such that any time the current screen is displayed in the user interface the tool bar is also displayed in a predetermined portion of the screen. When a user selects one of the icons of the tool bar, the system causes the communications device to perform the action associated with the selected icon.

Figure 1:
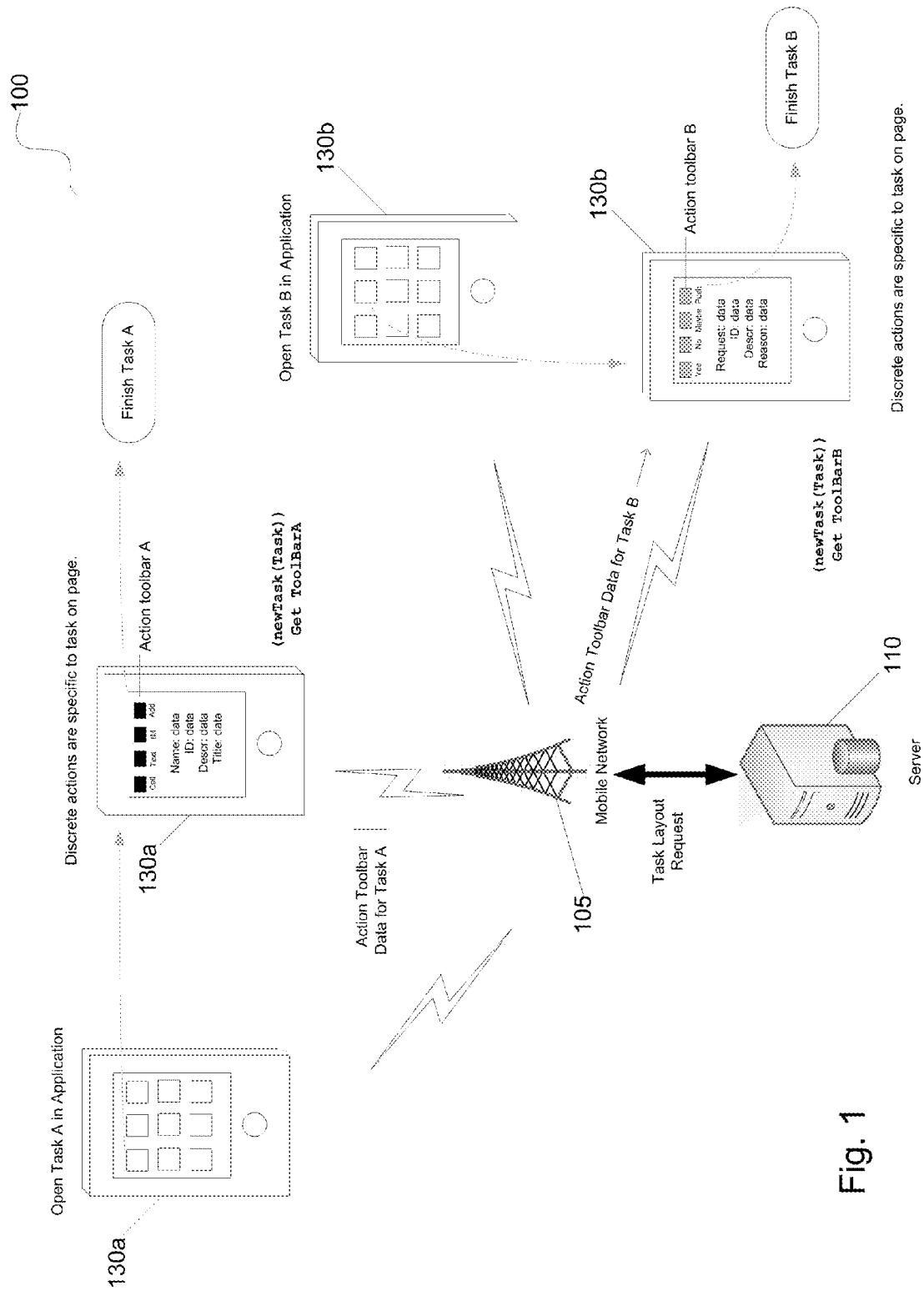
FIG. 1 illustrates a diagram of a system according to one embodiment of the invention.

FIG. 1 illustrates an example of a system 100 that may incorporate an embodiment of the present invention. FIG. 1 is merely illustrative of one example embodiment and other variations, modifications, and alternatives are possible without departing from the scope of the invention. In one embodiment, system 100 includes one or more user devices 130*a*, 130*b*. User devices 130 can be general purpose personal computers, such as a workstation and/or laptop computer. Alternatively, user devices 130 can be any other electronic device, such as a mobile telephone or personal digital assistant, capable of communicating via a network or displaying and navigating web pages or other types of electronic documents. Although FIG. 1 illustrates two user devices 130*a* and 130*b*, any number of user devices can be supported according to certain embodiments. These user devices 130 can also be configured to run a variety of applications, including office applications, email applications, personal contact and calendar applications, database client and/or server applications, and web browser applications.

System 100 further includes a network 105 that can provide voice and/or data communications capabilities for user devices 130. Network 105 can, therefore, be any type of network that can support data and/or voice communications using any protocols, including Transmission Control Protocol/Internet Protocol (TCP/IP), and the like. In one embodiment, network 105 is a mobile network such as the global system for mobile communications (GSM) network or code division multiple access (CDMA) network. Network 105 may also be a wireless network, such as a network operating under any of the IEEE 802.11 suite of protocols or WiMAX network. In other embodiments, network 105 can be the Internet, a local area network (LAN), a wide-area network, a virtual network, an intranet, an extranet, a public switched telephone network (PSTN), or an infra-red network. Network 105 can be configured to use any protocol known in the art, and can be implemented using any combination of these and/or other networks.

System 100 further includes at least one server 110 that may be configured to run an operating system and one or more applications that provide services to one or more user devices 130 and/or other devices on network 105. Server 110 may, for example, be a web server for processing requests for web pages or other electronic documents from user devices 130. The web server can run a variety of server applications, including hypertext transfer protocol (HTTP) servers, file transfer protocol (FTP) servers, database servers, Java servers, and the like. In some embodiments, server 110 may be configured to serve web pages that can be operated within a web browser of the user devices 130.

According to other embodiments, server 110 includes one or more file and/or application servers that include applications accessible by a client running on user devices 130 or other devices in system 100. Therefore, server 110 can include one or more general purpose computers capable of executing programs or scripts in response to user devices 130 or other devices in system 100. As an-other example, server 110 may include a database server which can process requests from database clients running on user devices 130.

According to some embodiments, server 110 can dynamically create pages, or portions thereof, for displaying information to user devices 130. The pages may be displayed as part of a graphical user interface on a display or screen of user devices 130. It should be noted that the functions of server 110 can be performed by a single server or a plurality of servers, depending on the implementation.

In one example of the invention, server 110 dynamically creates an action tool bar and provides the action tool bar to user device 130 for display. As illustrated in FIG. 1, a user of user device 130a might open or navigate to task A in an application. When the user opens task A, user device 130a requests, via network 105, the action tool bar associated with task A from server 110. In some embodiments, the page for task A and the application are stored in the memory of user device 130a so that the user device only needs to request the action tool bar for task A from server 110. In other embodiments, the request for the action tool bar also includes a request for the page for task A from server 110. When server 110 receives the request for the action tool bar associated with task A, server 110 retrieves the action tool bar for task A from memory and transmits the retrieved action tool bar to user device 130a via network 105.

At the same time, as shown in FIG. 1, a user of user device 130b might open or navigate to task B in an application. Similar to the above, user device 130b requests the action tool bar associated with task B from server 110 via network 105. Server 110 receives the request, retrieves the action tool bar associated with task B from memory, and transmits the retrieved action tool bar to user device 130b for display.

The action tool bar for task A includes at least one action that is specific to the context and content of task A, while the action tool bar for task B includes at least one action that is specific to the context and content of task B. Details regarding how an action tool bar is created and maintained will be discussed in further detail below in reference to FIG. 2.

Figure 2:
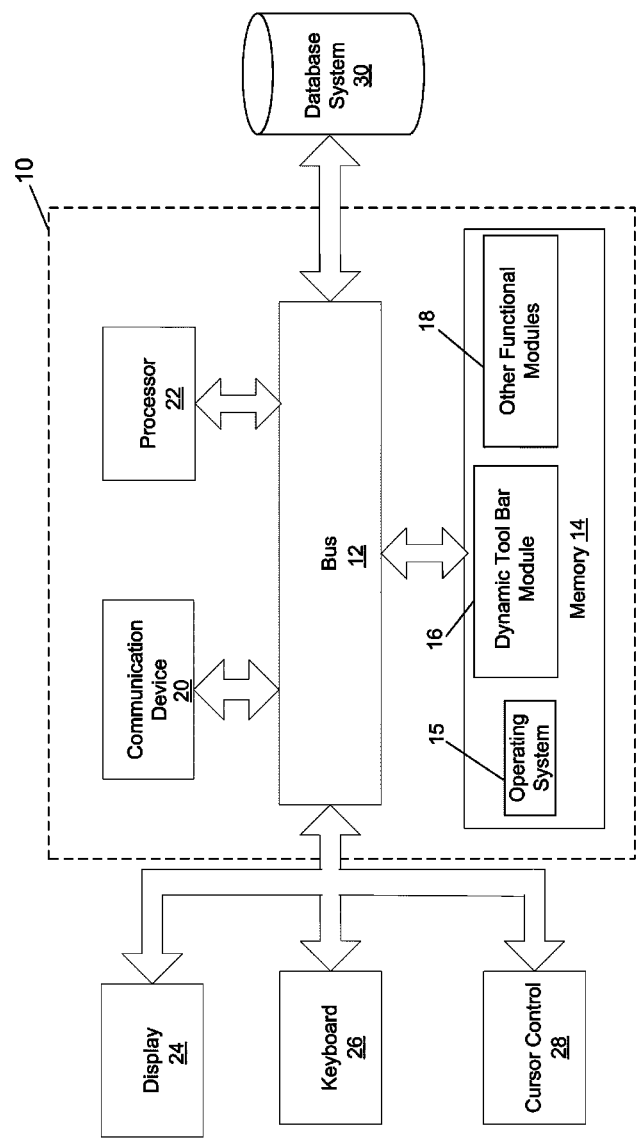
FIG. 2 illustrates a block diagram of an apparatus according to an embodiment.

FIG. 2 illustrates an apparatus 10 that may be configured to provide a dynamic tool bar to a user interface of a device, according to one embodiment. In some embodiments, apparatus 10 is implemented as a component of a network, such as a base station system or server in a mobile communications network. For instance, apparatus 10 can be included within server 110 described above and configured to perform one or more methods of the present invention. In other embodiments, the apparatus 10 may be implemented in an electronic device, such as a computing system, telephone, wireless communications device, gaming system, music or media player, personal digital assistant (PDA), or any other device with a graphical user interface or display.

Apparatus 10 may include a communications interface 12, such as a bus or other communications mechanism, for communicating information between components of apparatus 10. Alternatively, the components of apparatus 10 may communicate directly with each other, without use of communications interface 12.

Apparatus 10 also includes at least one processor 22, coupled to communications interface 12, for receiving, managing, and/or processing network or user input or information, and for executing instructions or operations. Processor 22 may be any type of general or specific purpose processor. In one embodiment, processor 22 may be included within an application specific integrated circuit (ASIC).

Apparatus 10 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media.

Computer readable media may be any available media that can be accessed by processor 22 and could include volatile or nonvolatile media, removable or non-removable media, and communication media. Communication media may include computer program code or instructions, data structures, program modules or other data, and includes any information delivery media.

Processor 22 can further be coupled, via communications interface 12 or directly, to a graphical user interface or display 24, such as liquid crystal display (LCD) or a thin film transistor (TFT) LCD, for displaying information to a user. Any type of display capable of presenting information to the user may be used, according to certain embodiments of the invention.

Apparatus 10 further includes a communication device 20, such as a transceiver, antenna, or network interface card or other communications interface, to provide access to and facilitate communications with a network. Additionally, communication device 20 may facilitate the receipt of information from a user or the network, and the transmission of information to the user or network. As a result, a user may interface with apparatus 10 directly or remotely through the network or any other method.

In one embodiment, memory 14 stores software modules or applications that provide functionality when executed by processor 22. The modules may include an operating system 15 that provides operating system functionality for apparatus 10. The memory 14 may also store other functional modules or applications 18, such as text editing or messaging applications, games, web browsers, etc. Apparatus 10 may also store a dynamic tool bar module 16 that facilitates the creation and display of a dynamic tool bar on the user interface of the device.

Processor 22 and memory 14 may also be coupled via bus 12 to a database system 30 and, thus, may be able to access and retrieve information stored in database system 30. Although only a single database is illustrated in FIG. 2, any number of databases may be used in accordance with certain embodiments. In some embodiments, database system 30 may store network and/or user information. In one example, database system 30 is configured to store, update, and retrieve data in response to SQL-formatted commands.

Database system 30 may include a database server and any type of database, such as a relational or flat file database. Database system 30 may store data for building a dynamic tool bar associated with each page of a graphical user interface on a user device. The dynamic tool bar can be designed based on the context and information displayed on the page associated with that dynamic tool bar. Database system 30 may also store any other data required by the dynamic tool bar module 16, or data associated with apparatus 10 and its associated modules and components.

According to one embodiment, apparatus 10 is configured to receive, via communications device 20 or other receiving device, a request for a page and/or action tool bar from a user device. In some embodiments, the page may already be stored in a memory of the user device. In such a situation, the request will only be for the action tool bar to be used on the page. In other embodiments, the request will be for both the page and the action tool bar to be used on that page.

When such a request is received from a user device, processor 22 is configured to determine the action(s) that are most commonly performed by a user from the requested page, based on the content and context of the requested page. Processor 22 may then dynamically create an action tool bar that includes visual icons which represent the most commonly performed action(s). An explanatory text label may be provided beneath the visual icon. In some embodiments, processor 22 associates the created action tool bar with the page, and controls the apparatus to forward the action tool bar and requested page to the user device for display on a screen thereof. Additionally, processor 22 may control apparatus 10 to store the action tool bar in memory 14 for re-use the next time a user navigates to the same page or for use with other pages.

In some embodiments, the display of the user device is a touchscreen display that allows a user to interact directly with what is presented on the display by using their finger, hand, stylus, or another passive object. However, in other embodiments, the user device display may be a standard display, such as an LCD, that can be interacted with via a keyboard or cursor control device, such as a computer mouse or touchpad. When the user device receives the action tool bar from apparatus 10, the user device is configured to display the action tool bar in a specific location of the page. For example, in one embodiment, the action tool bar is displayed below the page title in a prominent and easily identifiable section of the page. Activating one of the visual icons of the action tool bar by, for example, selecting or touching one of the visual icons causes the user device to perform the action or task represented by the icon. According to some embodiments, the action tool bar includes a predetermined number of visual icons, such as between three and five icons. Any number of icons can be displayed, however, depending upon the application, the size of the screen, and/or user preferences. Therefore, in some embodiments, the action tool bar can be customizable by a user of the user device.

Figure 3:
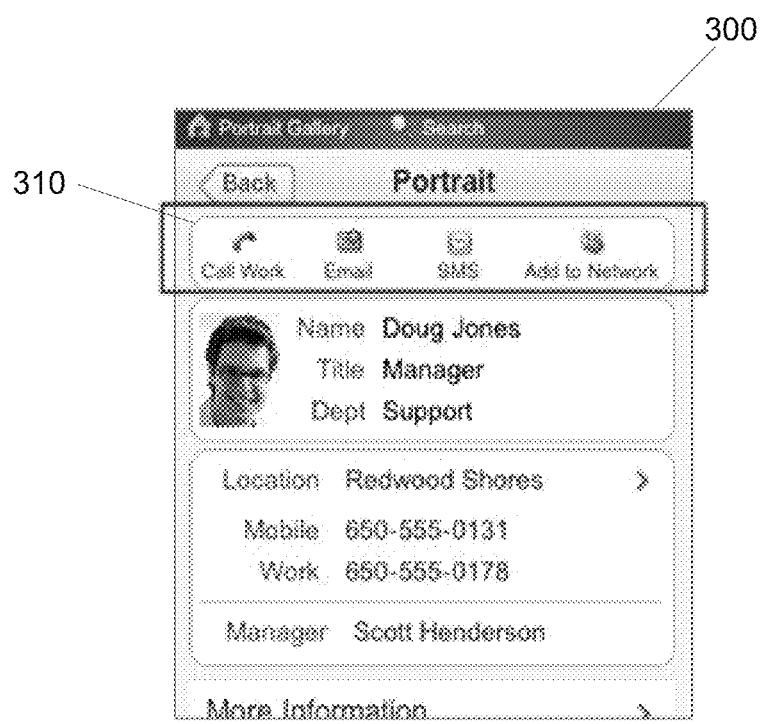
FIG. 3 illustrates a user interface according to one embodiment.

FIG. 3 illustrates an example page of a user interface of a user device. In this example, FIG. 3 shows a contact page 300 in a graphical user interface on a touchscreen of a mobile communications device. An action tool bar 310 is included below the title of the page and includes four icons corresponding to actions that are in context of the current screen's data. In this embodiment, action tool bar 310 includes icons representing a call work action, an email action, a short message service (SMS) action, and an add to network action. Activating the call work icon of action tool bar 310 will cause the mobile communication device to call the work phone number of the contact. Activating the email icon of action tool bar 310 will cause the mobile communication device to create an email addressed to the contact. Activating the SMS icon of action tool bar 310 will cause the mobile communications device to create a SMS addressed to the contact, and activating the add to network icon will cause the mobile communication device to add the contact to the user's network.

In this example, the type of actions that are displayed as icons of action tool bar 310 are determined or chosen based on the type, context, and content of the data displayed on page 300. Further, as discussed above, apparatus 10 can make the determination of which icons should be displayed in the action tool bar 310 based on the data displayed and also based on which of those actions are most commonly performed by a user viewing such a page. For instance, because the data on page 300 relates to contact information of an individual, the action tool bar 310 created for page 300 includes the most commonly used actions which relate to calling, emailing, text messaging, and/or networking with the contact.

Figures 4A, 4B:
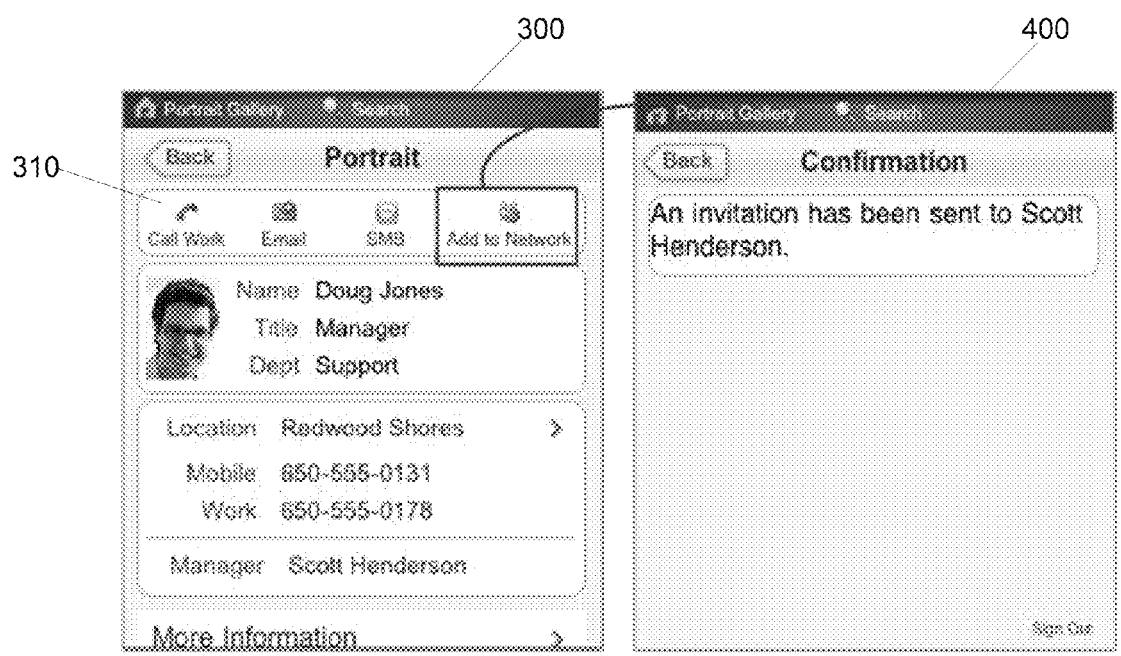
FIG. 4*a* illustrates a user interface according to another embodiment.
FIG. 4*b* illustrates a user interface according to another embodiment.

FIG. 4a again illustrates contact page 300 and action tool bar 310, where the add to network icon is activated as shown by the square surrounding that icon. FIG. 4b illustrates an example of the page displayed as a result of the activation of the add to network icon. As shown in FIG. 4b, activation of the add to network icon causes the mobile device to send an invitation to the contact for addition to the user's network, and to display a confirmation page 400 that indicates to the user that an invitation has been sent.

Figures 5A, 5B:
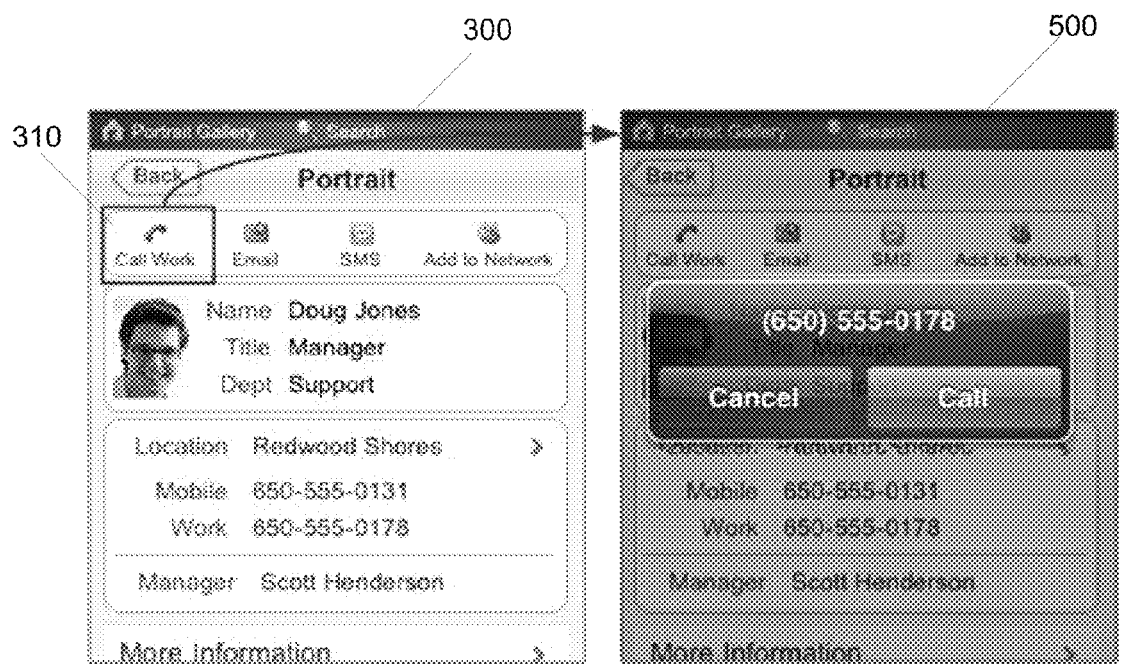
FIG. 5*a* illustrates a user interface according to another embodiment.
FIG. 5*b* illustrates a user interface according to another embodiment.

FIG. 5a also illustrates contact page 300 and action tool bar 310. In this example, the call work icon of action tool bar 310 is activated as shown by the square surrounding that icon. FIG. 5b illustrates the result of the activation of the call work icon. As shown in FIG. 5b, activation of the call work icon of action tool bar 310 causes the mobile communication device to initiate a call to the work telephone number of the contact as displayed in page 500.

Figure 6:
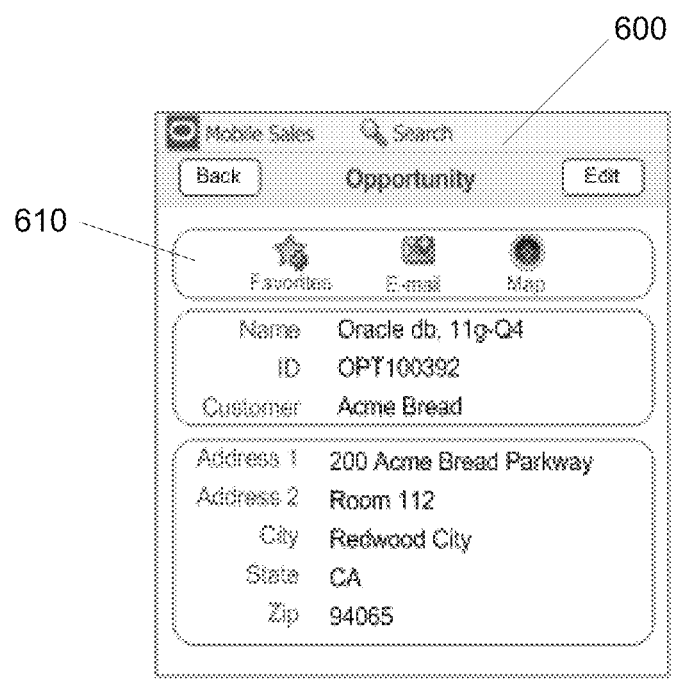
FIG. 6 illustrates a user interface according to another embodiment.

FIG. 6 illustrates another example page 600 of a user interface of a user device. As shown in FIG. 6, page 600 displays information related to a sales customer, such as the customer name, ID, and address. Page 600 also includes an action tool bar 610 that includes icons representing a favorites action, an email action, and a map action. In this example, activating the favorites icon will cause the user device to add the displayed customer to a list of favorites. Activating the email icon will cause the user device to create an email addressed to the displayed customer. Activating the map icon will cause the user device to display a map of the location of the customer. As discussed above, apparatus 10 can determine which actions should be displayed as icons in action tool bar 610 based on the type, context, and content of the information displayed in page 600, and based on a determination of which actions are most commonly performed by a user from page 600.

Figure 7:
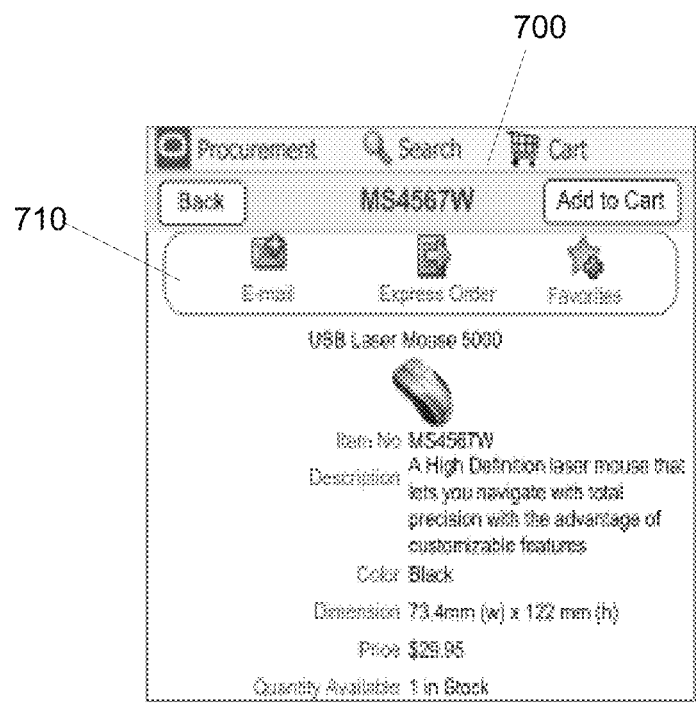
FIG. 7 illustrates a user interface according to another embodiment.

FIG. 7 illustrates an example of a procurement page 700 of a user interface of a user device. Procurement page 700 includes information related to a product that may be purchased, such as the item number, description, price, quantity, size, etc. Procurement page 700 also includes an action tool bar 710 that includes icons representing an email action, an express order action, and a favorites action. Activating the email icon will cause the user device to create an email addressed to the displayed customer. Activating the express order icon will cause the user device to initiate an order of the displayed item. Activating the favorites icon will cause the user device to add the displayed item to a list of favorite items for the user. In one embodiment, apparatus 10 can determine which actions should be displayed as icons in action tool bar 710 based on the type, context, and content of the information displayed in page 700, and based on a determination of which actions are most commonly performed by a user from page 700. For instance, apparatus 10 will determine that page 700 displays an item for sale and that one of the most commonly executed actions from such a page is initiating an order for the item. As a result, apparatus 10 will include the express order icon in action tool bar 710.

Embodiments of the invention are not limited to the actions and/or icons discussed above. The actions and icons described herein are merely representative examples. Any number of actions and icons may be developed and utilized according to certain embodiments of the invention. Further, the action tool bars can be customizable by a user and can be dynamically created for new pages of a user interface.

Figure 8:
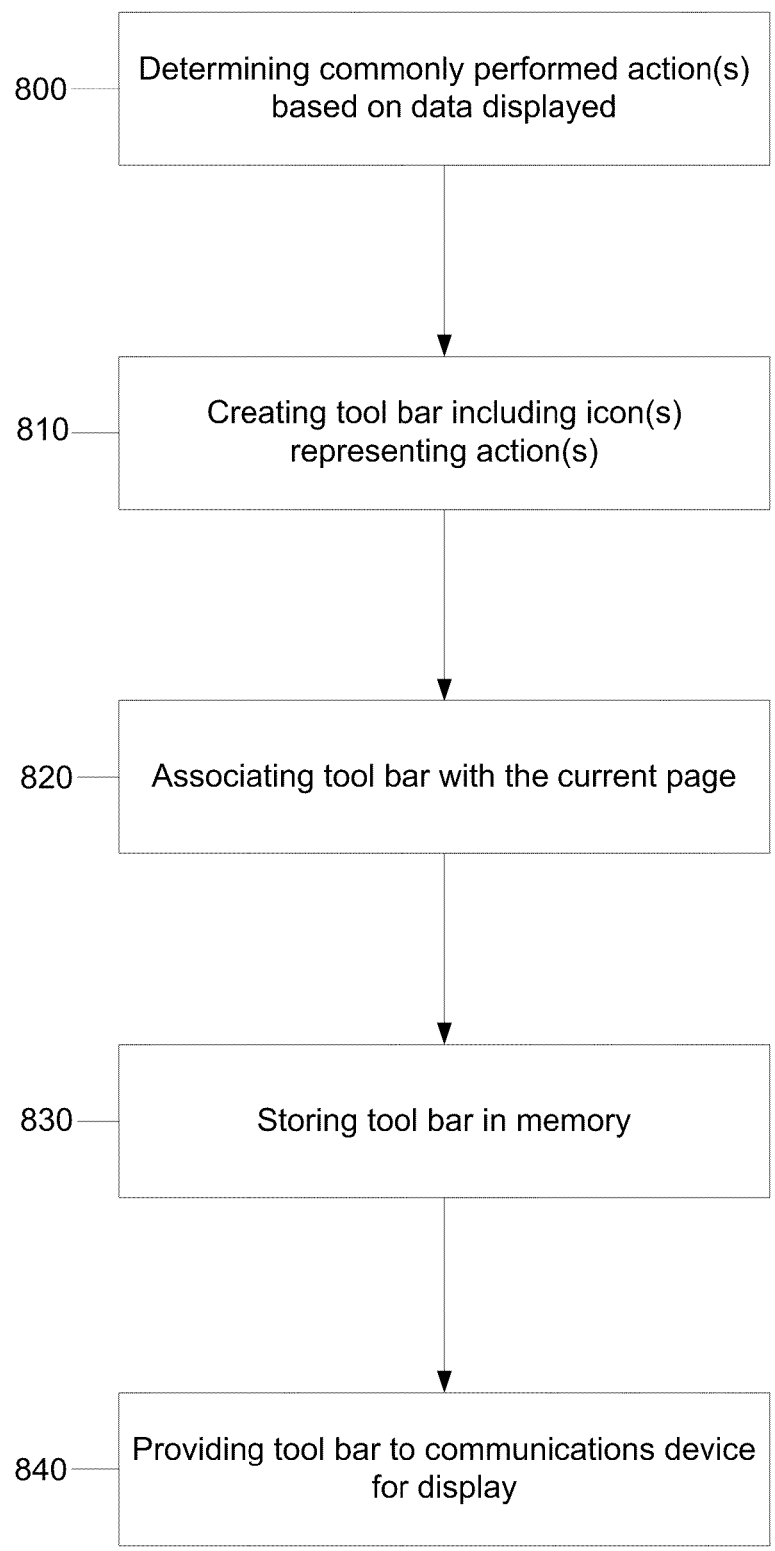
FIG. 8 illustrates a flow chart of a method according to an embodiment.

FIG. 8 illustrates a flow diagram of a method for providing a dynamic tool bar in user interface, according to one embodiment of the invention. In one embodiment, the functionality of the flow diagram illustrated in FIG. 8 is implemented by software stored in memory or other computer readable or tangible media, and executed by a processor. In other embodiments, the functionality may be performed by hardware (e.g., through the use of an application specific integrated circuit (ASIC), a programmable gate array (PGA), a field programmable gate array (FPGA), etc.), or any combination of hardware and software.

The method of FIG. 8 includes, at 800, determining at least one action that is commonly performed based on data displayed on a current page of a graphical user interface of a communications device. As outlined above, the current page of the user interface may be parsed to determine the context and type of information displayed thereon. Based on this, a determination is made of the most commonly performed actions that a user might desire to perform from that page. The method further includes, at 810, creating a tool bar that includes at least one icon representing the at least one action that was determined to be most commonly performed by a user. The number of icons included in the tool bar may be determined based, for example, on the size of the display of the communications device, the type of display, the resolution of the display, the number of pixels available on the display, and the like. For example, a communications device with a relatively small display or number of pixels may be limited to between three and five icons; whereas, a communications device with a larger display may include more than five icons.

Referring again to FIG. 8, at 820, the method includes associating the created tool bar with the current page of the graphical user interface. In some embodiments, the method may also include, at 830, storing the created tool bar in memory so that the tool bar may be re-used any time the user returns to the current page or so that the tool bar can be used with other pages that have a similar context and type of content. At 840, the method includes providing the tool bar to the communications device for display on the current page of the graphical user interface.

Embodiments of the invention may also include a computer program embodied on a non-transitory computer readable storage medium. The computer program may include computer code or instructions that, when executed by a processor, cause the processor to execute any of the methods described herein, such as the method illustrated in FIG. 8.

In view of the above, embodiments of the invention include a computer-implemented method for dynamically providing an action tool bar in a user interface of a device. The method may include determining actions that are commonly performed by a user when viewing a certain page of the user interface, based on the type of data that is displayed in that page. The method may then include building a tool bar that includes icons for those commonly performed actions and providing the tool bar for display on the page. When a user clicks or selects one of the icons, the device performs the action associated with the selected icon. As a result, embodiments of the invention can automatically prioritize the actions that are most important to the user on each page of a user interface, and present those actions in an easy to use tool bar. As a result, a user can clearly determine which action can be taken on a specific page and quickly locate the desired functionality from the tool bar. This can result in enhanced productivity and improved experience for the user.

Embodiments of the invention present only available actions present on the current screen. By way of example, there is no access to a menu that requires the user to navigate to additional options in order to take action. All actions, represented by icons, are explicit and contextual to the data shown on the current screen of the interface. In addition, according to certain embodiments, the action tool bar only provides individual actions. There are no navigation options included. Furthermore, the actions are dynamic in that a different user interface or set of data will have a different set of actions related only to that page.

It should be noted that many of the functional features described in this specification have been presented as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A non-transitory computer-readable medium having instructions stored thereon that, when executed by a processor, cause the processor to provide a tool bar for an application, the providing comprising:
  determining, by a server, in response to receiving a request to display a current page of a graphical user interface of a communications device a context and type of data to be displayed on the current page;
  determining, by the server, one or more actions commonly performed by using data on a page having a similar context and type of data as the current page;
  creating, by the server, the tool bar comprising icons that each represent one of the one or more actions;
  associating, by the server, the tool bar with the current page of the graphical user interface;
  providing, by the server, the tool bar to the communications device for display on the current page of the graphical user interface when the current page is initially displayed on the communications device and before a user action is performed on the current page;
  storing the tool bar by the server in a memory; and
  providing the tool bar, by the server, for re-use when a second page having the similar context and type of data as the current page is displayed on a second device,
  wherein a selection of one of the icons causes an associated commonly performed action to be performed by using the data displayed on the current page as an input value, wherein the server, in response to receiving the request to display the current page of the graphical user interface of the communications device, determines that the context and type of the data to be displayed on the current page relates to contact information of an individual;
  wherein the server determines that actions that are commonly performed by using a contact information relate to calling, emailing, text messaging, and networking with a contact;
  wherein the server creates the tool bar comprising icons that each represent one of calling, emailing, text messaging, or networking with the contact;
  wherein the server provides the tool bar to the communications device for display on the current page of the graphical user interface;
  wherein the server stores the tool bar in the memory; wherein the server provides the tool bar for re-use when the second pace relating to another contact information is displayed on the second device;
  wherein the icons of the tool bar represent a call work action, an email action, a short message service (SMS) action, and an add to network action;
  wherein activating an icon representing the call work action causes the communications device to call a work phone number of the individual;
  wherein activating an icon representing the email action causes the communications device to create an email addressed to the individual;
  wherein activating an icon representing the SMS action causes the communications device to create an SMS addressed to the individual; and
  wherein activating an icon representing the add to network action causes the communications device to add the individual to a user's network.

2. The computer-readable medium according to claim 1, wherein activating each of the icons causes the communications device to perform an action represented by a corresponding icon.

3. The computer-readable medium according to claim 1, wherein the tool bar comprises between three and five icons.

4. The computer-readable medium according to claim 1, further comprising displaying the tool bar on a touchscreen of the communications device, the touchscreen displaying the current page of the graphical user interface.

5. The computer-readable medium according to claim 1, further comprising determining a number of icons to be included in the tool bar.

6. The computer-readable medium according to claim 5, wherein the determining of the number of icons to be included in the tool bans based at least on a size of a screen of the communications device or a number of pixels on the screen.

7. A computer-implemented method for providing a tool bar for an application, the method comprising:
  determining, by a server, in response to receiving a request to display a current page of a graphical user interface of a communications device, a context and type of data to be displayed on the current page;
  determining, by the server, one or more actions commonly performed by using the data on a page having a similar context and type of data as the current page;
  creating, by the server, the tool bar comprising icons that each represent one of the one or more actions;
  associating, by the server, the tool bar with the current page of the graphical user interface;
  providing, by the server, the tool bar to the communications device for display on the current page of the graphical user interface when the current page is initially displayed on the communications device and before a user action is performed on the current page;
  storing the tool bar by the server in a memory; and
  providing the tool bar, by the server, for re-use when a second page having the similar context and type of data as the current page is displayed on a second device,
  wherein a selection of one of the icons causes an associated commonly performed action to be performed by using the data displayed on the current page as an input value, wherein the server, in response to receiving the request to display the current page of the graphical user interface of the communications device, determines that the context and type of the data to be displayed on the current page relates to contact information of an individual;
  wherein the server determines that actions that are commonly performed by using a contact information relate to calling, emailing, text messaging, and networking with a contact;
  wherein the server creates the tool bar comprising icons that each represent one of calling, emailing, text messaging, or networking with the contact;
  wherein the server provides the tool bar to the communications device for display on the current page of the graphical user interface;
  wherein the server stores the tool bar in the memory;
  wherein the server provides the tool bar for re-use when the second page relating to another contact information is displayed on the second device;
  wherein the icons of the tool bar represent a call work action, an email action, a short message service (SMS) action, and an add to network action;
  wherein activating an icon representing the call work action causes the communications device to call a work phone number of the individual;
  wherein activating an icon representing the email action causes the communications device to create an email addressed to the individual;

wherein activating an icon representing the SMS action causes the communications device to create an SMS addressed to the individual; and wherein activating an icon representing the add to network action causes the communications device to add the individual to a user's network.

8. The method according to claim 7, wherein activating each of the icons causes the communications device to perform an action represented by a corresponding icon.

9. The method according to claim 7, further comprising displaying the tool bar on a touchscreen of the communications device, the touchscreen displaying the current page of the graphical user interface.

10. The computer-implemented method according to claim 7, further comprising determining the number of icons to be included in the tool bar based at least on a size of a screen of the communications device or a number of pixels on the screen.

11. An apparatus, comprising:
a processor; and
a memory coupled to the processor,
wherein the processor is configured to cause the apparatus to:
determine, in response to receiving a request to display a current page of a graphical user interface of a communications device, a context and type of data to be displayed on the current page;
determine one or more actions commonly performed by using data on a page having a similar determined context and type of data as the current page;
create a tool bar comprising icons, each icon representing one of the one or more actions;
associate the tool bar with the current page of the graphical user interface;
provide the tool bar to the communications device for display on the current page of the graphical user interface when the current page is initially displayed on the communications device and before a user action is performed on the current page;
store the tool bar in the memory; and
provide the tool bar for re-use when a second page having the similar context and type of data as the current page is displayed on a second,
wherein a selection of one of the icons causes an associated commonly performed action to be performed by using the data displayed on the current page as an input value, wherein the apparatus, in response to receiving the request to display the current page of the graphical user interface of the communications device, determines that the context and type of the data to be displayed on the current page relates to contact information of an individual;

wherein the apparatus determines that actions that are commonly performed by using a contact information relate to calling, emailing, text messaging, and networking with a contact;

wherein the apparatus creates the tool bar comprising icons that each represent one of calling, emailing, text messaging, or networking with the contact;

wherein the apparatus provides the tool bar to the communications device for display on the current page of the graphical user interface;

wherein the apparatus stores the tool bar in the memory; wherein the apparatus provides the tool bar for re-use when the second page relating to another contact information is displayed on the second device;

wherein the icons of the tool bar represent a call work action, an email action, a short message service (SMS) action, and an add to network action;

wherein activating an icon representing the call work action causes the communications device to call a work phone number of the individual;

wherein activating an icon representing the email action causes the communications device to create an email addressed to the individual;

wherein activating an icon representing the SMS action causes the communications device to create an SMS addressed to the individual; and wherein activating an icon representing the add to network action causes the communications device to add the individual to a user's network.

12. The apparatus according to claim 11, wherein each of the icons causes the communications device to perform an action represented by a corresponding icon.

13. The apparatus according to claim 11, wherein the tool bar comprises between three and five icons.

14. The apparatus according to claim 11, wherein the tool bar is displayed on a touchscreen of the communications device, the touchscreen displaying the current page of the graphical user interface.

15. The apparatus according to claim 11, the processor further configured to cause the apparatus to determine the number of icons to be included in the tool bar based at least on a size of a screen of the communications device or a number of pixels on the screen.

* * * * *

UNITED STATES PATENT AND TRADEMARK OFFICE
CERTIFICATE OF CORRECTION

PATENT NO. : 9,753,605 B2  
APPLICATION NO. : 12/788544  
DATED : September 5, 2017  
INVENTOR(S) : Chen et al.

Page 1 of 1

It is certified that error appears in the above-identified patent and that said Letters Patent is hereby corrected as shown below:

In the Claims

In Column 9, Line 5, In Claim 1, delete "device" and insert -- device, --, therefor.

In Column 9, Line 45, In Claim 1, delete "pace" and insert -- page --, therefor.

In Column 10, Line 11, In Claim 6, delete "bans" and insert -- bar is --, therefor.

In Column 11, Line 29, In Claim 11, after "similar" delete "determined".

In Column 11, Line 43, In Claim 11, delete "second," and insert -- second device, --, therefor.

Signed and Sealed this  
Twenty-second Day of May, 2018

Andrei Iancu  
*Director of the United States Patent and Trademark Office*